United States Patent
Yamazaki

[11] 3,901,584
[45] Aug. 26, 1975

[54] SOLID-STATE ELECTRO-OPTIC DISPLAY DEVICE

[75] Inventor: Satoshi Yamazaki, Suwa, Japan

[73] Assignee: Kabushiki Kaisha Suwa Seikosha, Tokyo, Japan

[22] Filed: Jan. 22, 1974

[21] Appl. No.: 435,565

[30] Foreign Application Priority Data
Jan. 22, 1973   Japan.................................. 48-9257

[52] U.S. Cl. ............... 350/150; 340/173.2; 350/157
[51] Int. Cl.² .......................................... G02F 1/26
[58] Field of Search ..................................... 350/150

[56] References Cited
UNITED STATES PATENTS
| | | | |
|---|---|---|---|
| 3,449,038 | 6/1969 | Scarrott............................. | 350/150 |
| 3,512,864 | 5/1970 | Haertling et al.................... | 350/150 |
| 3,807,831 | 4/1974 | Soref................................. | 350/150 |

*Primary Examiner*—John K. Corbin
*Attorney, Agent, or Firm*—Blum, Moscovitz, Friedman & Kaplan

[57] ABSTRACT

A solid-state display device utilizes a transparent ferroelectric crystal having a plurality of transparent, conductive electrodes on each of opposed surfaces. Application of a voltage to said electrodes in a manner such as to establish and maintain electric fields which are essentially parallel to said opposed surfaces makes it possible to display one or a plurality of images in a single space. For said display, polarized light is directed at one of said surfaces.

3 Claims, 7 Drawing Figures

SOLID-STATE ELECTRO-OPTIC DISPLAY DEVICE

BACKGROUND OF THE INVENTION

When an electric field is applied to a medium, its refractive index is changed in accordance with the following equation:

$$\Delta \left(\frac{1}{n^2}\right) = r \cdot E + h \cdot E \cdot E + \cdots$$

In this electro-optical effect, the first term on the right-hand side of the equation is named the Pockels effect and the second term is called Kerr effect. This change in the refractive index has been utilized as a light shutter and as a light modulator, as well as for other purposes. By means of the change in refractive index, it is therefore possible to alter the intensity of light by passage through a medium subjected to an appropriately directed electric field. Further, when polarized light is directed at such a medium linearly polarized light can be converted into circularly polarized light or elliptically polarized light and the plane of polarization can be rotated. In the choice of crystals for utilization of this phenomenom, it is desirable to use materials in which the change of refractive index with voltage is as high as possible. Transparent ferroelectric crystals made by conventional means have proved to be the most suitable for this purpose.

SUMMARY OF THE INVENTION

A transparent ferroelectric crystal having opposed surfaces which are essentially parallel to each other is the basis for an electro-optical device. Shaped, transparent conductive electrodes connectible to one or more sources of voltage are formed on said opposed surfaces. Said electrodes are so positioned that when voltages are suitably applied, electric fields are established which are essentially parallel to said surfaces. As a result, when linearly-polarized light is directed against one of said surfaces at essentially normal incidence, said plane-polarized light can be converted into circularly or elliptically polarized light or the plane of polarization can be rotated. Therefore, such a crystal, in combination with a polarizer and an analyzer can display optionally one or more images in a single display region. Further, two or more images can be superimposed on each other in the same display region.

Accordingly, an object of the present invention is an improved electro-optical device in which electric fields can be established and maintained in a direction essentially parallel to opposed surfaces.

A further object of the present invention is an improved electro-optical device in which the plane of polarization can be rotated as a means of displaying one or more images selectively in a single display region.

An important object of the present invention is an improved electro-optical device in which plane-polarized light can be converted into circularly polarized or elliptically polarized light, or the plane of polarization can be rotated.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4b represents the characters formed by said plurality of fields as imposed in FIG. 4a.

DESCRIPTION OF THE PREFERRED EMBODIMENT

Figure 1:
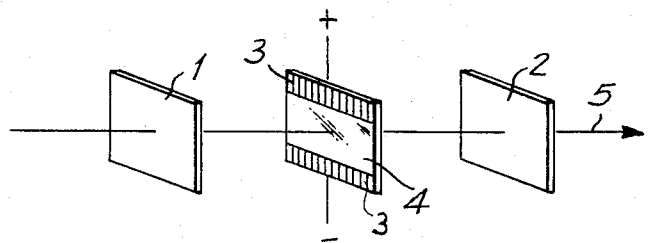
FIG. 1 is a diagrammatic, exploded view of a conventional solid-state display device.

A conventional solid-state display device utilizing a transparent ferroelectric crystal is shown in FIG. 1 where transparent ferroelectric crystal 4 is positioned between polarizer 1 and analyzer 2. Crystal 4 is provided with transparent electrodes 3 at opposite edges of said crystal, as shown. When an electric field is applied between electrodes 3, the field which is essentially parallel to opposed surfaces of crystal 4 changes the refractive index in the direction of the field by $\Delta n$. The phase difference $\delta$ of the doubly refracted beams is expressed by the following equation:

$$\delta = \frac{2\pi}{\lambda} \times \Delta n \times l$$

$\lambda$ : wave-length of light
$l$ : length of optical path

By means of imposed fields of appropriate intensity, linearly polarized light of rectangularly intersecting components can be changed to elliptically polarized light, or circularly polarized light, or the plane of polarization can be rotated, depending on the change in the refractive index, or, more precisely, the difference in phase $\delta$ resulting from the difference $\Delta n$ in the two beams.

When the light component which is perpendicular to the plane of polarization in the incident light is removed by the analyzer, the intensity of the output light is given by $$I_o = I_i \sin^2 \frac{\delta}{2}$$

wherein, $I_i$ is the intensity of the incident light. Accordingly, when $\delta/2 = n\pi$, the display region is dark and when $\delta/2 = (2n+1)\pi/2$, the display region is light, n in all cases being integral. Accordingly, both the intensity and the nature of the light emerging from the crystal may be controlled by imposition of electric fields such as to produce desired values of δ. The phrase "the nature of the light" refers to its state of polarization, i.e., whether circularly or elliptically polarized, or whether the plane of polarization is different from that of the original. Where the plane of polarization is rotated so that it becomes parallel to or perpendicular to the plane of the analyzer, the display is respectively light or dark.

Figure 2A:
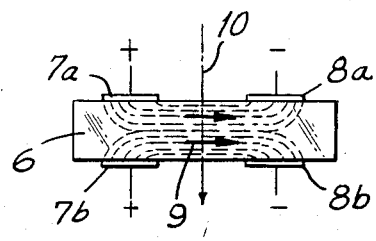
FIG. 2a is a sectional view of a ferroelectric crystal in which a field parallel to opposed surfaces is established.
Figure 2B:
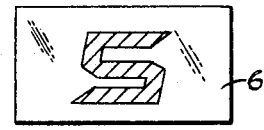
FIG. 2b is a plan view of the device of FIG. 2a showing a number displayed as the result of the imposition of an electric field.

Sectional view FIG. 2a shows how electrodes may be placed on opposite surfaces of a transparent ferroelectric crystal to establish a field which is essentially parallel to opposed surfaces of said crystal. Transparent ferroelectric crystal 6 has a pair of positive electrodes 7a and 7b near one edge thereof and a second pair of electrodes, these being negative, and referenced 8a and 8b, near an opposed edge of said crystal 6. A field 9 is established, said field 9 being essentially parallel to opposed surfaces of said crystal 6 and perpendicular to light beam 10 directed at essentially normal incidence to opposed surfaces of crystal 6. As will be realized, the electrode structure shown in FIG. 2a is the equivalent of that shown in FIG. 1. FIG. 2b represents in plan view a character, in this case the numeral 5. The manner in which electrodes should be disposed on the surfaces of the ferroelectric crystal 6 in order to produce such a character is described in application Ser. No. 396,341, Filed: Sept. 11, 1973 and assigned to the same Assignee.

It will be noted that in the conventional arrangement of FIG. 2a electrodes 7a and 7b are connected in parallel as are electrodes 8a and 8b. Consequently, the electric field indicated by the reference numeral 9 permeates the entire cross-section of crystal 6. Accordingly, the corresponding change in the index of refraction takes place throughout the thickness of crystal 6.

Figure 3A:
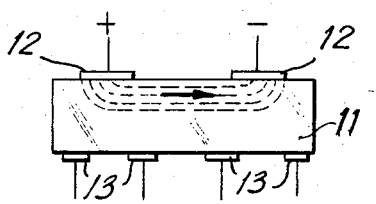
FIG. 3a is a device in accordance with the present invention in which an electric field is imposed in a direction parallel to opposed surfaces by means of a pair of electrodes on one surface of a ferroelectric crystal.
Figure 3B:
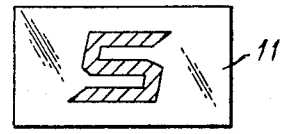
FIG. 3b shows a character formed by said electric field.

In the case of ferroelectric crystal 11 shown in FIGS. 3a and 3b, two electrodes 12 are formed on the upper surface of crystal 11 and four electrodes 13 are formed on the lower surface of crystal 11. As shown in FIG. 3a, a potential difference is established between upper electrodes 12, and the resultant electric field permeates only the upper portion of crystal 11, electrodes 13 being unactivated. However, the change in the index of refraction of the upper portion of crystal 11 is sufficient for display of a character as shown in FIG. 3b.

Figure 4A:
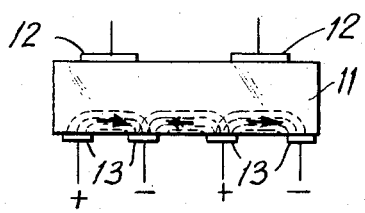
FIG. 4a is a sectional view of a ferroelectric crystal in accordance with the present invention wherein a plurality of electric fields are applied in a direction parallel to one surface of said crystal.

As shown in FIG. 4a, electrodes 13 may have voltages applied thereto so that two of the electrodes are positive and two are negative. When the polarities are applied as shown in FIG. 4a, the electric field between the middle two electrodes on the bottom surface of crystal 11 is in the opposite direction from the fields between the outer pairs of electrodes. Using such an arrangement of applied voltages, where the fields lie in the lower portion of crystal 11, letters as shown in FIG. 4b can be displayed.

Figure 4B:

It will be noted that, dependent on whether electrodes 12 or electrodes 13 are activated, either the number 5 as shown in FIG. 3b or the letters SUN as shown in FIG. 4b can be shown. Furthermore, as is evident from the fact that the field developed by electrodes 12 lies in the upper portion of crystal 11 whereas the field developed by electrodes 13 lies in the lower portion of crystal 11, activation of electrodes 12 and 13 simultaneously will result in superimposition of the two displays in the same region of the crystal 11. Consequently, the device of the present invention makes it possible by selective activation of sets of electrodes to produce different displays in the same display region, or, optionally to superimpose a plurality of images upon each other.

It will thus be seen that the objects set forth above among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A solid-state electro-optic display device for displaying optionally one or a pluarlity of images in a single region, comprising a transparent ferroelectric crystal having two essentially parallel surfaces, a first electrode structure on one of said parallel surfaces for generating at least one electric field parallel to and in a portion of said cyrstal proximate said one surface, a second electrode structure on the other of said surfaces for generating at least one electric field parallel to and in a portion of said crystal proximate said other surface, said first and second electrode structures being different from each other and each of said electrode structures being constructed and arranged for displaying different indicia, means for selectively applying voltages to said electrode structures and cooperating with same to generate said electric fields, and polarizer and analyzer plates at said parallel surfaces, whereby the intensity and the nature of light passing through said cyrstal may be varied.

2. The solid-state electroc-optic display device as defined in claim 1 wherein the thickness of said portions is sufficiently restricted that an indicium may be displayed by a field proximate on surface independently of a field proximate the other surface.

3. The solid-state electro-optic display device as defined in claim 1, wherein said portions on said parallel surfaces overlap and the thickness of said portions is sufficiently restricted that indicia on both of said surfaces may be shown in a single region of said crystal simultaneously.

* * * * *